(12) United States Patent
Kong et al.

(10) Patent No.: US 8,139,040 B2
(45) Date of Patent: *Mar. 20, 2012

(54) METHOD OF OPERATING A MULTI-POINT TOUCH-SENSITIVE SYSTEM

(75) Inventors: Jing Kong, Shenzhen (CN); Chuanrui Ji, Shenzhen (CN); Yun Yang, Shenzhen (CN); Wei Feng, Shenzhen (CN); Qifeng Li, Shenzhen (CN)

(73) Assignee: BYD Company, Ltd., Shenzhen (CN)

( * ) Notice: Subject to any disclaimer, the term of this patent is extended or adjusted under 35 U.S.C. 154(b) by 693 days.

This patent is subject to a terminal disclaimer.

(21) Appl. No.: 12/313,881

(22) Filed: Nov. 24, 2008

(65) Prior Publication Data

US 2010/0053094 A1 Mar. 4, 2010

(30) Foreign Application Priority Data

Aug. 28, 2008 (CN) .......................... 2008 1 0141744

(51) Int. Cl.
*G06F 3/041* (2006.01)
(52) U.S. Cl. ..................................... 345/173
(58) Field of Classification Search .................. 345/173, 345/184; 341/22; 340/407.2; 178/18.03; 257/48
See application file for complete search history.

(56) References Cited

U.S. PATENT DOCUMENTS

| 4,044,642 | A  | * | 8/1977  | Pearlman et al. ............. 84/690 |
| 6,967,348 | B2 | * | 11/2005 | Cowles et al. ................ 257/48 |
| 7,084,787 | B2 | * | 8/2006  | Olodort et al. ............... 341/22 |
| 7,511,702 | B2 | * | 3/2009  | Hotelling ..................... 345/173 |
| 7,782,230 | B2 | * | 8/2010  | Olodort et al. ............... 341/22 |
| 7,800,589 | B2 | * | 9/2010  | Hurst et al. .................. 345/173 |
| 7,952,564 | B2 | * | 5/2011  | Hurst et al. .................. 345/173 |
| 2007/0273670 | A1 | * | 11/2007 | Nordahl ....................... 345/173 |
| 2009/0009491 | A1 | * | 1/2009  | Grivna ......................... 345/184 |
| 2009/0050376 | A1 | * | 2/2009  | Jeon et al. ................... 178/18.03 |
| 2009/0143106 | A1 | * | 6/2009  | Meitzler et al. .............. 455/566 |
| 2009/0207140 | A1 | * | 8/2009  | Hansson ....................... 345/173 |
| 2009/0322496 | A1 | * | 12/2009 | da Costa ...................... 340/407.2 |
| 2010/0002016 | A1 |   | 1/2010  | Kim |

FOREIGN PATENT DOCUMENTS

| CN | 1949153 A   | 4/2007 |
| CN | 101576795   | 11/2009 |
| JP | 2000-112642 | 4/2000 |
| JP | 2005049978  | 2/2005 |
| JP | 2010055614  | 3/2010 |
| TW | I289282 B   | 11/2007 |

* cited by examiner

*Primary Examiner* — Fred Tzeng
(74) *Attorney, Agent, or Firm* — Morgan, Lewis & Bockius LLP (57) ABSTRACT

A computer-implemented method in connection with a multi-touch detection system is disclosed. The multi-touch detection system includes a touch-sensitive device, a microcontroller coupled to the touch sensitive device, and an electronic application coupled to the microcontroller. The touch-sensitive device has multiple electrically isolated conductive regions. In response to detecting multiple simultaneous contacts a user has with the conductive regions, the touch-sensitive device generates multiple output signals, one signal for each of the multiple simultaneous contacts, and transmits the output signals to the microcontroller. The microcontroller is configured to generate one or more control signals in response to the output signals and transmit the control signals to the electronic application. The electronic application includes a screen displaying multiple human-machine interactive objects. In response to the control signals, the electronic application alters the appearance of the human-machine interactive objects on the screen.

20 Claims, 12 Drawing Sheets

METHOD OF OPERATING A MULTI-POINT TOUCH-SENSITIVE SYSTEM

RELATED APPLICATIONS

This application claims priority to Chinese Patent Application No. 200810141744.X, "Method of Operating A Multi-Point Touch-Sensitive System," filed on Aug. 28, 2008, which is hereby incorporated by reference in its entirety.

FIELD OF THE INVENTION

The present invention relates generally to the field of touch-sensitive displays, and in particular to the method of operating a multi-point touch-sensitive system.

BACKGROUND OF THE INVENTION

Today, almost every electronic application provides a user interface for human-machine interactions, such as a push button, a keypad, and a mouse. Among various user interface related technologies, touch-sensitive displays (also known as "touch screen" or "touch panel") are becoming more and more popular for being intuitive and user-friendly. Touch-sensitive displays are widely used in electronic applications, in particular, portable devices and public systems. As a user interface, a touch-sensitive display detects a user contact with the display, translates the user contact into an electronic signal, and transmits the signal to a signal processor. Through signal analysis, the signal processor determines the location of the user contact on the touch-sensitive display and performs one or more corresponding operations in accordance with the location of the user contact.

SUMMARY

One aspect of the invention involves a computer-implemented method in connection with a multi-touch detection system. The multi-touch detection system includes a touch-sensitive device, a microcontroller coupled to the touch sensitive device, and an electronic application coupled to the microcontroller. The touch-sensitive device has multiple electrically isolated conductive regions. In response to detecting multiple simultaneous contacts a user has with the conductive regions, the touch-sensitive device generates multiple output signals, one signal for each of the multiple simultaneous contacts, and transmits the output signals to the microcontroller. The microcontroller is configured to generate one or more control signals in response to the output signals and transmit the control signals to the electronic application. The electronic application includes a screen displaying multiple human-machine interactive objects. In response to the control signals, the electronic application alters the appearance of the human-machine interactive objects on the screen.

BRIEF DESCRIPTION OF THE DRAWINGS

The aforementioned features and advantages of the invention as well as additional features and advantages thereof will be more clearly understood hereinafter as a result of a detailed description of embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Many technologies can be used to make different types of touch panels targeting at various industrial applications, including surface acoustic wave touch panel, infrared touch panel, capacitive touch panel, and resistive touch panel, etc.

A surface acoustic wave touch panel monitors ultrasonic waves that pass over the surface of the touch panel. When the panel is touched by a finger, a portion of the wave is absorbed, constituting a touch event on the touch panel. This change in the ultrasonic waves is detected to estimate the position of the touch event, i.e., the finger contact on the touch panel.

An infrared (IR) touch panel employs two different methods to capture touch events. One method detects thermal induced changes of the surface resistance of the touch panel. The other method is to deploy on the touch panel an array of vertical and horizontal IR sensors for detecting the interruption of a modulated light beam near the surface of the touch screen.

A capacitive touch panel is a glass panel coated with a conductive and transparent material such as indium tin oxide (ITO), light emitting polymer (LEP) or the like that conducts an electrical current across the touch panel. The touch panel acts as a capacitor with a carefully controlled field of stored electrons in both the horizontal and vertical axes of the touch panel. The human body also acts as an electrical device that has stored electrons and therefore also exhibits capacitance. When the touch panel's "normal" capacitance field (its reference state) is disturbed by another capacitance field, i.e., a user's finger, electronic circuits located at the corners of the touch panel detect the resultant "distortion" in the reference capacitance field as a touch event, which information can be used to estimate the location of the touch event on the touch panel.

A resistive touch panel is composed of multiple layers, including two thin electrically conductive layers, i.e., an upper conductive layer and a lower conductive layer that are separated by a thin space. At operation, there is a voltage drop and an electrical current through the lower conductive layer when a power supply is applied to the lower conductive layer. When a user touches the upper conductive layer of the resistive touch panel using, e.g., a finger or a stylus, the two conductive layers are brought into contact at a certain point. In some embodiments, the upper conductive layer generates a signal corresponding to the voltage level at the contact point. This voltage signal can be used to measure the location of the contact point on the touch panel. In some other embodiments, a portion of the electrical current flows into the upper conductive layer through the contact point, causing a change in the electrical current in the lower conductive layer. The amount of the electrical current change is detected as a touch event and used for estimating the location of the contact point on the touch panel. For illustration, a resistive touch panel generating a voltage output signal is described in detail in the present application. But it will be clear to one skilled in the art that the same teaching also applies to a resistive touch panel configured to detect current changes.

Figure 1:
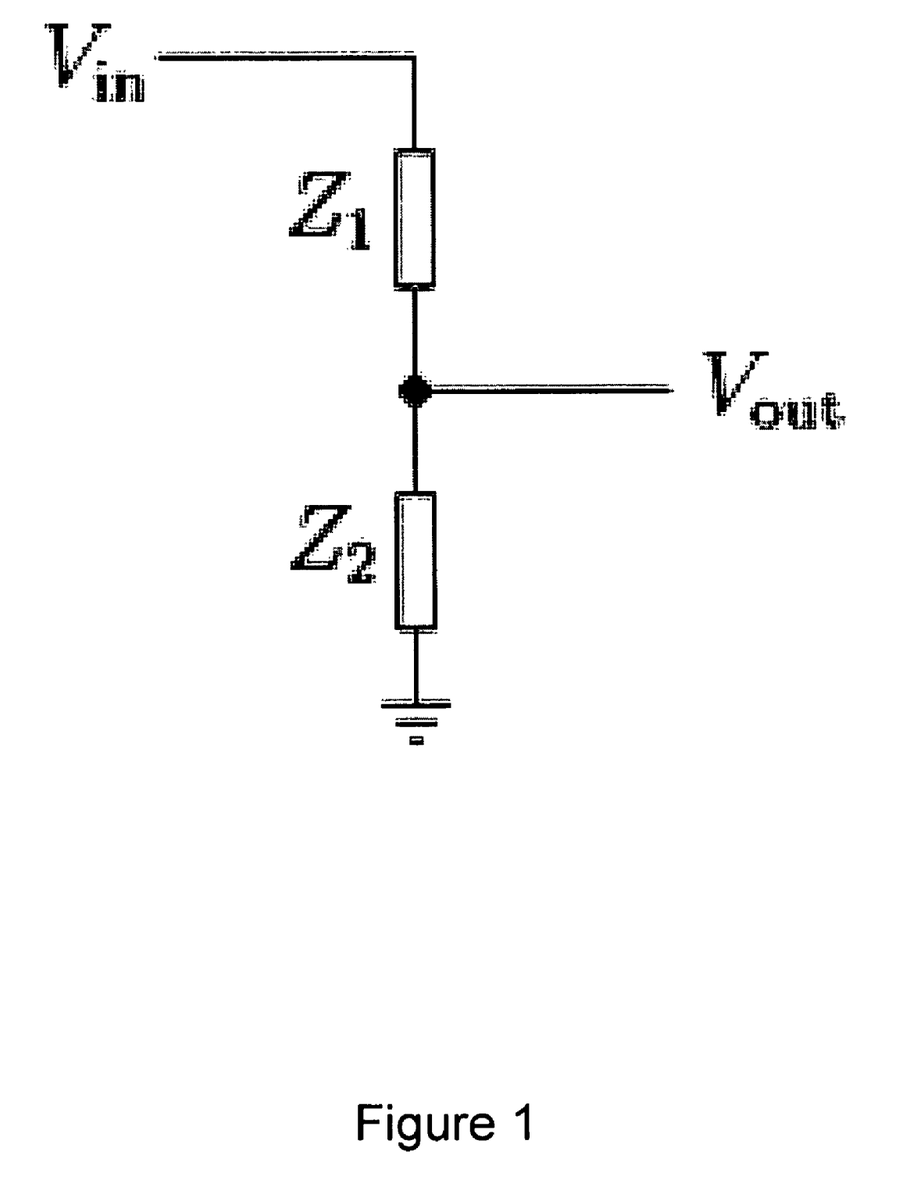
FIG. 1 is a block diagram illustrative of a voltage divider.

The voltage-based resistive touch panel electrically acts as a voltage divider with an output terminal. FIG. 1 is a block diagram illustrative of such a voltage divider. The serially-connected resistors $Z_1$ and $Z_2$ represent the two portions of the lower conductive layer that is divided by the contact point with the upper conductive layer. If a power supply $V_{in}$ is applied to the two opposite ends of the two resistors, a voltage signal at the output terminal $V_{out}$ is:

$$V_{out} = \frac{Z_2}{Z_1 + Z_2} V_{in}$$

For ease of illustration, resistive touch panels having voltage output terminals are described in detail in the exemplary embodiments of the present application. But it will be apparent to one skilled in the art that the invention disclosed in this application is by no means limited to resistive touch panels and the same invention can be implemented in the touch panels based on other technologies known in the art.

Figure 2:
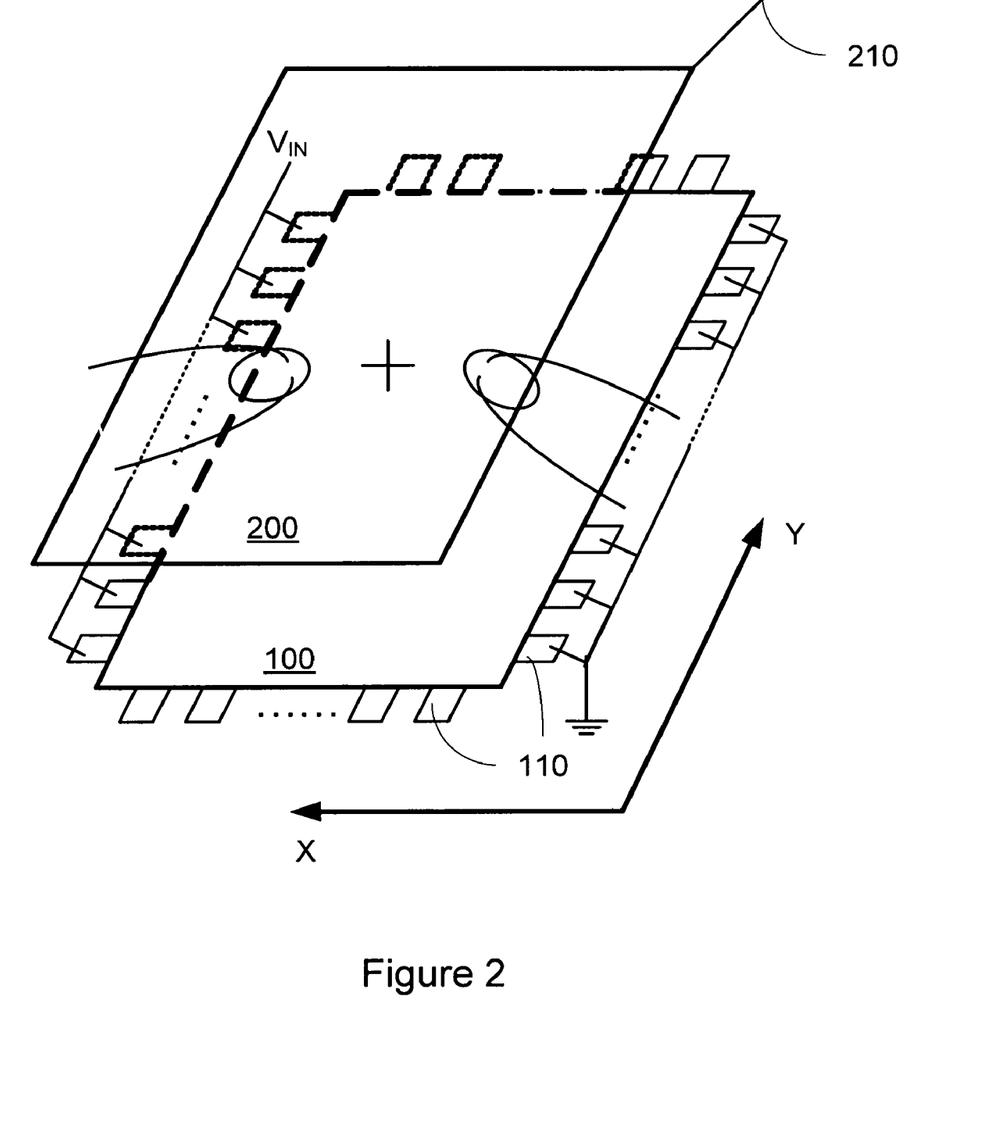
FIG. 2 is a block diagram illustrative of a device having a single touch-sensitive region and subject to two finger contacts simultaneously.

FIG. 2 is a block diagram illustrative of a device having a single touch-sensitive region and subject to two finger contacts simultaneously.

The resistive touch panel includes at least two parts, a base 100 and a contact film 200. In some embodiments, the base 100 is a panel made of hard materials (such as glass) that offers the mechanical stability required by the device and the contact film 200 is made of soft materials, e.g., poly ethylene terephthalate (PET), which provides the flexible medium through which the two parts can be connected under pressure. In some embodiments, both the top surface of the base 100 and the bottom surface of the plastic contact film 200 are coated with conductive and transparent materials like ITO or LEP.

The touch panel may have different shapes, regular or irregular, depending on the specific application that uses the touch panel. For example, the touch panel shown in FIG. 2 has a rectangular shape with four edges. Four sets of electrodes 110 are deployed along the four edges and they are electrically coupled to the conductive layer on the top surface of the base 100. The contact film 200 has a signal output terminal 210 coupled to the conductive layer at the bottom surface.

In particular, the conductive layers that are attached to the base 100 and the contact film 200, respectively, are separated in space by a spacer layer (not shown in FIG. 2). When there is no pressure applied to the top surface of the contact film 200, the two conductive layers are electrically insulated from each other. When an object such as a finger tip presses the contact film 200, the contact film 200 deforms downward and brings the two conductive layers into contact.

If there is only a single contact point, e.g., the point represented by the "+" sign, between the two conductive layers, the location of the contact point on the touch panel can be determined by (i) applying a power supply to the two sets of electrodes on the left and right edges of the base 100 and measuring an output signal at the terminal 210 and (ii) applying a power supply to the two sets of electrodes at the upper and lower edges of the base 100 and measuring another output signal at the terminal 210. Each of the two output signals can help to determine the x-coordinate and y-coordinate of the contact point of the two conductive layers, which is therefore the location of the contact point.

If there are two or more finger contacts on the touch panel simultaneously, which have at least two contact points, the touch panel according to the configuration shown in FIG. 2 can only generate two output signals corresponding to the x-coordinate and y-coordinate of one estimated contact point. In this case, the estimated location is probably an estimate of the average of the two or more finger contact points on the touch panel. An electronic application that uses the touch panel as a user interface device can not interpret the user's instruction correctly based on the average of the two finger contact points if the averaged finger contact point and the two actual finger contact points correspond to different interface objects on the touch panel. To avoid this issue, the user has to be very careful not to have two finger contacts with the touch panel at the same time. This restriction also prevents the touch panel from supporting applications that may need the multi-touch feature for more sophisticated human-machine interactive operations.

Figure 3:
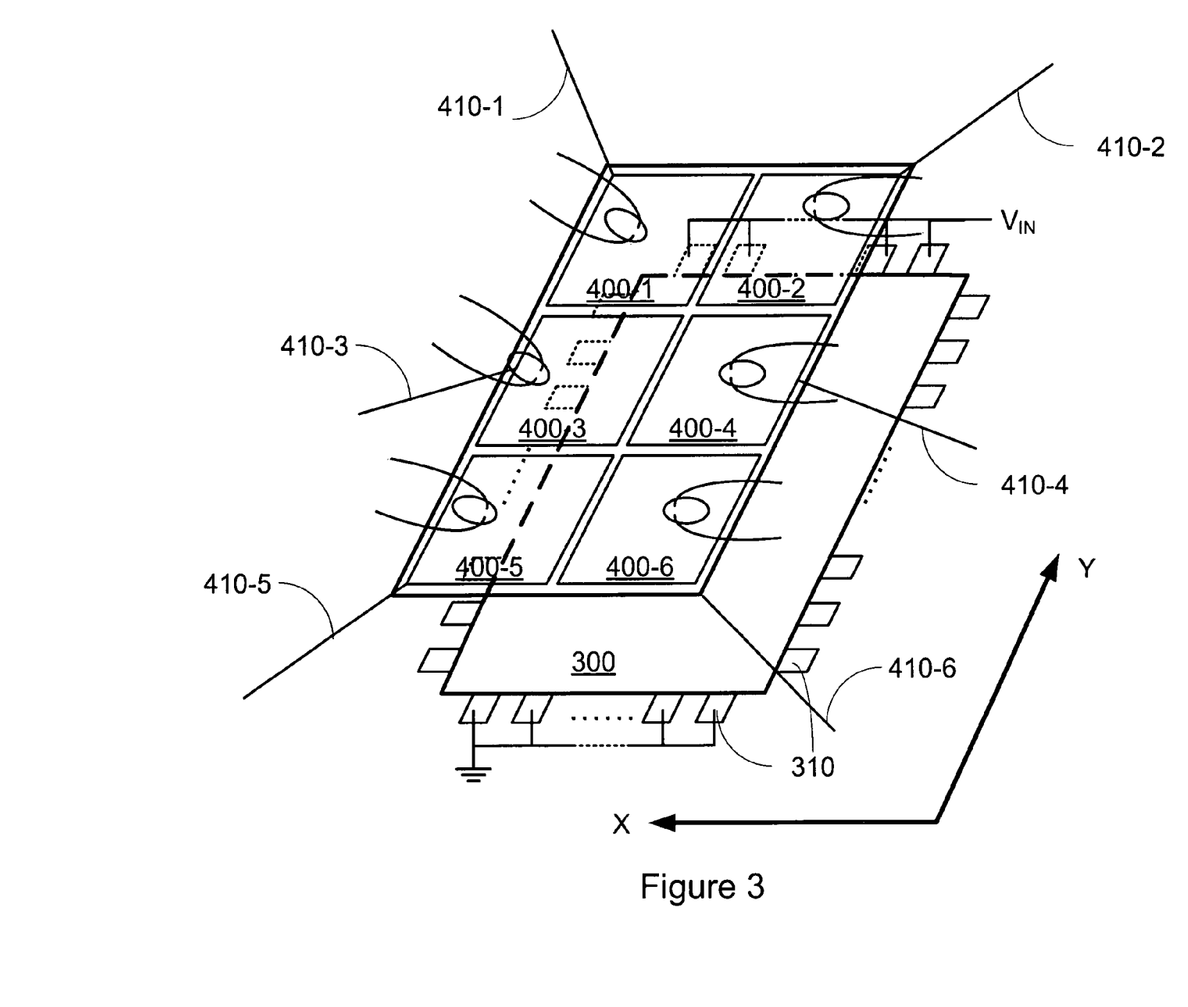
FIG. 3 is a block diagram illustrative of a device having multiple touch-sensitive regions and subject to six finger contacts simultaneously in accordance with some embodiments.

FIG. 3 is a block diagram illustrative of a device having multiple touch-sensitive regions and subject to six finger contacts simultaneously in accordance with some embodiments.

Like the touch panel shown in FIG. 2, the touch panel in FIG. 3 also has a base 300 and a contact film 400, each coated with a conductive layer. Four sets of electrodes 310 are distributed on the four edges of the base 300. To support the multi-touch feature, the conductive layer at the bottom side of the contact film 400 is divided into six electrically isolated conductive regions 400-1 through 400-6, each conductive region having its own output terminal 410-1 to 410-6. Because the six conductive regions are electrically insulated from one another, each conductive region can generate an independent output signal when there is a finger contact at each of the six conductive regions at the same time.

As shown in FIG. 3, each of the six conductive regions is subject to a finger touch at the same time. Simultaneously, a power supply $V_{in}$ is applied to the electrodes at the upper and lower edges of the base 300 and there are six voltage signals at the six output terminals, each signal originating from a contact point in the corresponding conductive region. Next, the power supply $V_{in}$ is removed from the electrodes at the upper and lower edges of the base 300 and applied to the electrodes on the left and right edges of the base 300, another six voltage signals at the six output terminals are generated while the six fingers have not been lifted off the top surface of the touch panel. As a result, each of the six conductive regions is associated with a pair of signal measurements, one associated with the left and right edges and the other one associated with the upper and lower edges of the base 300. Each pair of signal measurements can be used to estimate a contact point within a corresponding conductive region and six simultaneous and unique finger contact points on the touch panel can be detected.

Figure 4A:
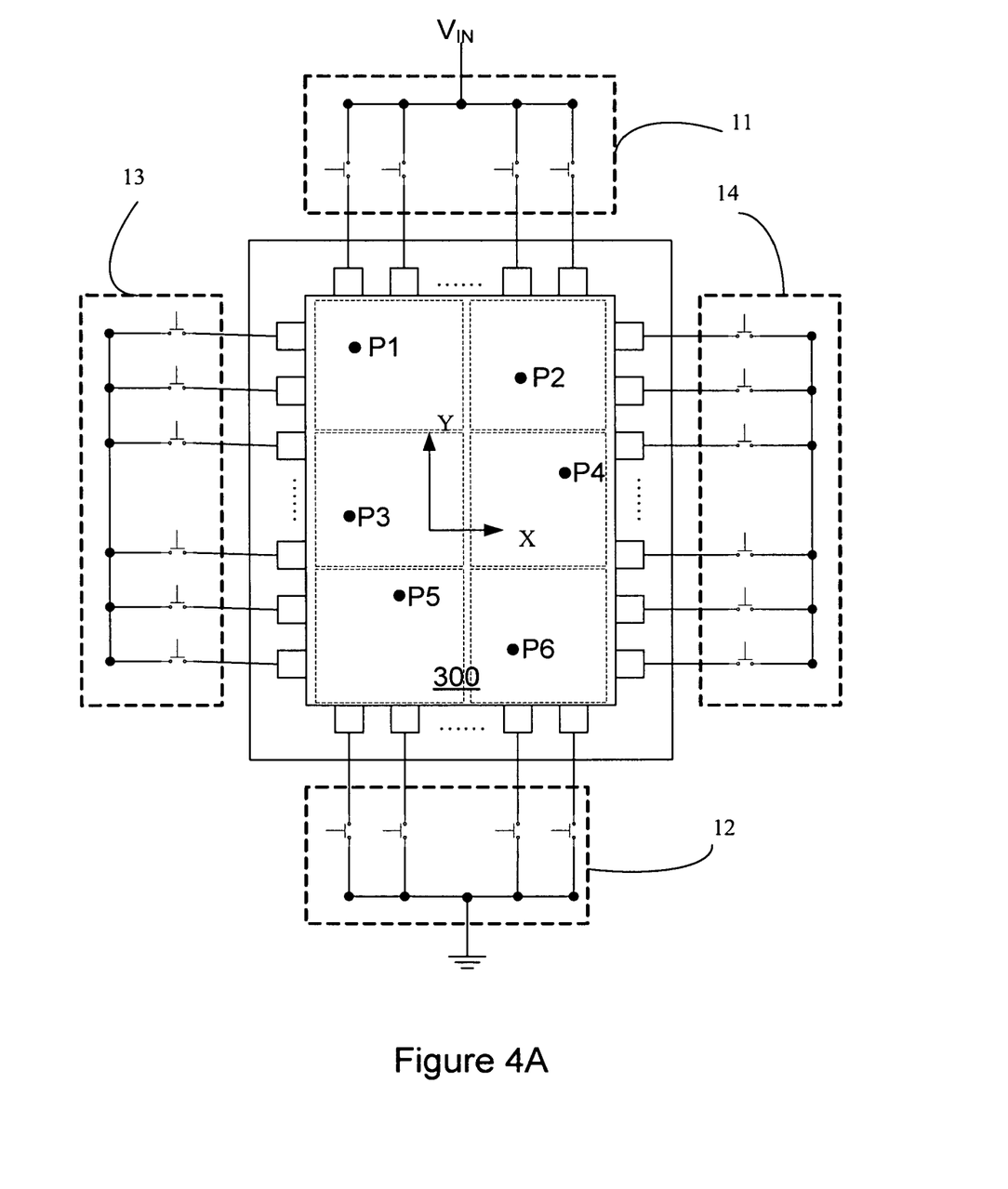
FIGS. 4A and 4B are block diagrams illustrative of how the multi-touch device shown in FIG. 3 is coupled to and controlled by control circuits in accordance with some embodiments.
Figure 4B:
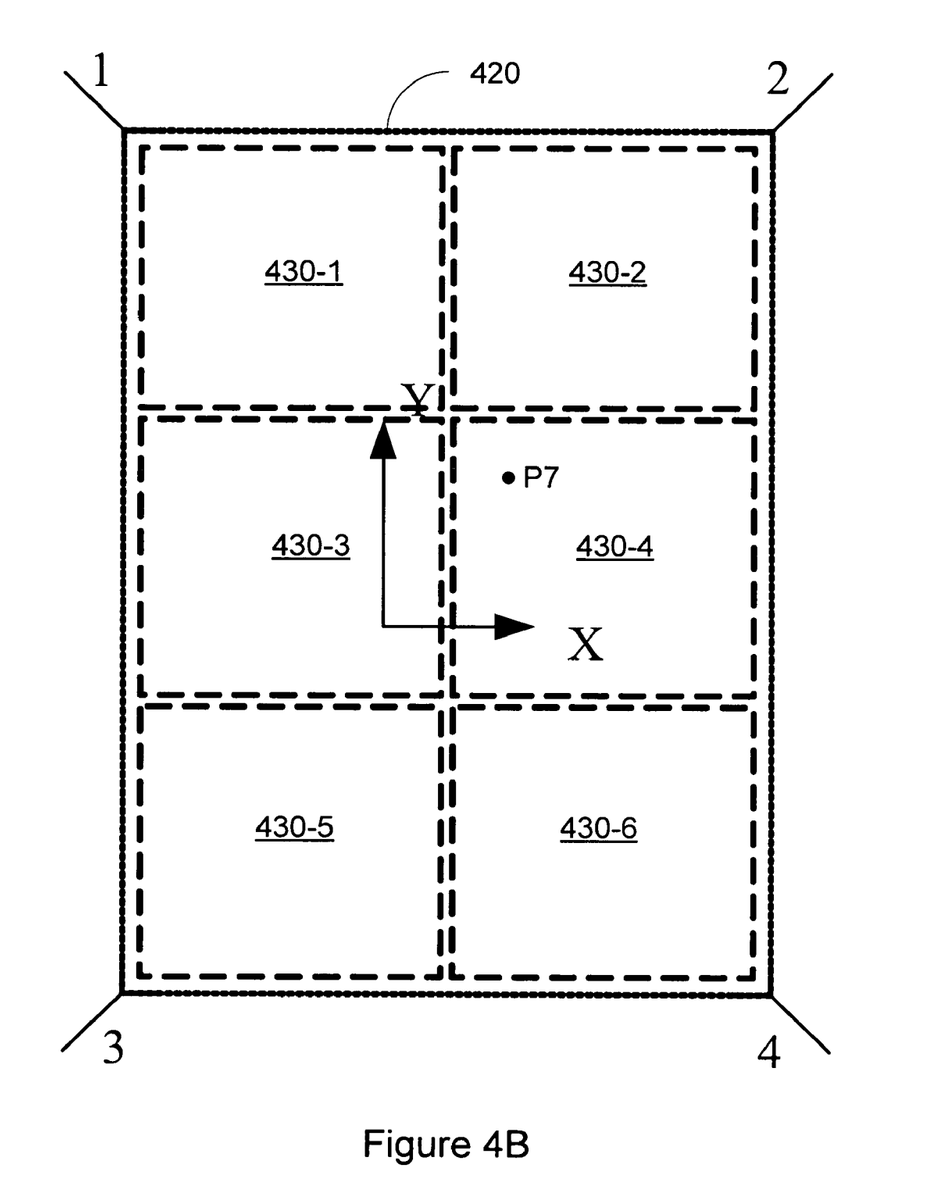

FIGS. 4A and 4B are block diagrams illustrative of how the multi-touch device shown in FIG. 3 is coupled to and controlled by control circuits in accordance with some embodiments.

The six dashed-line boxes within the base 300 represent the projection of the six conductive regions of the contact film 400 onto the base 300. Note that there is no overlapping region between any two adjacent conductive regions. Each of the four control circuits 11 through 14 is coupled to at least one set of electrodes along one edge of the base 300. In some embodiments, a control circuit includes multiple switches, each switch controlling the on/off state at a corresponding electrode. When a switch coupled to an electrode is turned on, an electrical circuit loop including the switch and the electrode is formed. A finger contact with any of the six conductive regions generates a voltage output signal at the corresponding output terminal. In some embodiments, the touch panel is coupled to and controlled by an Application-Specific Integrated Circuit (ASIC), such as a touch panel microcontroller, through the four control circuits. In some other embodiments, the four control circuits are part of the microcontroller. In some other embodiments, the touch panel is coupled to multiple touch panel microcontrollers, each microcontroller being responsible for controlling the operation of the touch panel in one or more directions.

Referring again to FIG. 4A, to estimate the y-coordinate of a finger contact point (e.g., P1) within a particular conductive region, a power supply $V_{in}$ is applied to the two sets of electrodes at the upper and lower opposite edges of the base 300. Depending on how the control circuits 11 and 12 operate, the touch panel generates one or more output signals at the output terminal associated with the conductive region having the finger contact. In some embodiments, the switches within the two control circuits 11 and 12 are configured to switch on and off in accordance with a predefined scheme to minimize the error caused by the pillow-shape electric field distortion within the conductive layer on the base 300. For example, the different switches within the control circuits 11 and 12 can switch on and off at the same time during the course of detecting the finger contact location. In another embodiment, a pair of switches, one within the control circuit 11 and a symmetrically located one within the control circuit 12, is switched on and off one at the same time. By doing so, multiple measurements are generated at the same output terminal and an average of the multiple measurements is used for estimating the y-coordinate of the finger contact point. In some embodiments, the averaged measurement is determined by weighting the multiple measurements in accordance with the locations of their corresponding pair of switches along the edges of the base 300.

Note that there are many schemes known in the art for operating the multiple switches within each control circuit to achieve satisfactory measurements. A Chinese patent application entitled "A touch-sensitive structure and a resistive touch panel using the touch-sensitive structure," filed May 6, 2008 (App. No. CN200810096144.6), is herein incorporated by reference in its entirety. The schemes disclosed therein can be applied to the touch panels according to some embodiments of the present invention.

The electrically isolated conductive regions on the contact film of a resistive multi-point touch-sensitive device can have different shapes and sizes in accordance with the dimension of the entire touch panel as well as the requirements by the electronic application. For example, each of the six conductive regions in FIG. 4A is a square of the same size. This configuration may be desired if the application has the same or similar resolution requirement for estimating the x-coordinate and y-coordinate of a contact point. In some embodiments, each conductive region has a rectangular shape of the same or different sizes. In this case, the touch panel may have different resolution requirements along the x-axis and the y-axis. In some embodiments, a conductive region is a regular or irregular polygon. In some embodiments, the conductive region is a circle or an ellipse.

FIG. 4B depicts a top view of a touch panel having multiple conductive regions. The touch panel has the upper and lower conductive layers. The upper conductive layer is divided into six rectangular conductive regions 430-1 through 430-6. The lower conductive layer 420 has four electrodes 1 through 4 at its four corners. To measure the y-coordinate of a contact point "P7," the electrodes 1 and 2 are coupled to the anode of a power supply and the electrodes 3 and 4 are coupled to the cathode of the power supply. Because the upper conductive layer is brought into contact with the lower conductive layer 420 at the contact point P7, the output terminal of the conductive region 430-4 generates a voltage signal whose magnitude has a predefined relationship (e.g., proportional) with the y-coordinate of the contact point. After measuring the y-coordinate, the electrodes 1 and 3 are coupled to the anode of the power supply and the electrodes 2 and 4 are coupled to the cathode of the power supply. In this case, the output terminal of the conductive region 430-4 generates another voltage signal whose magnitude has a predefined relationship (e.g., proportional) with the x-coordinate of the contact point. Note that the voltage measurements in the x and y directions are made within a short time period during which the upper and lower conductive layers are in contact at point P7 and the finger has not been lifted off the top surface of the touch panel.

Figure 5A:
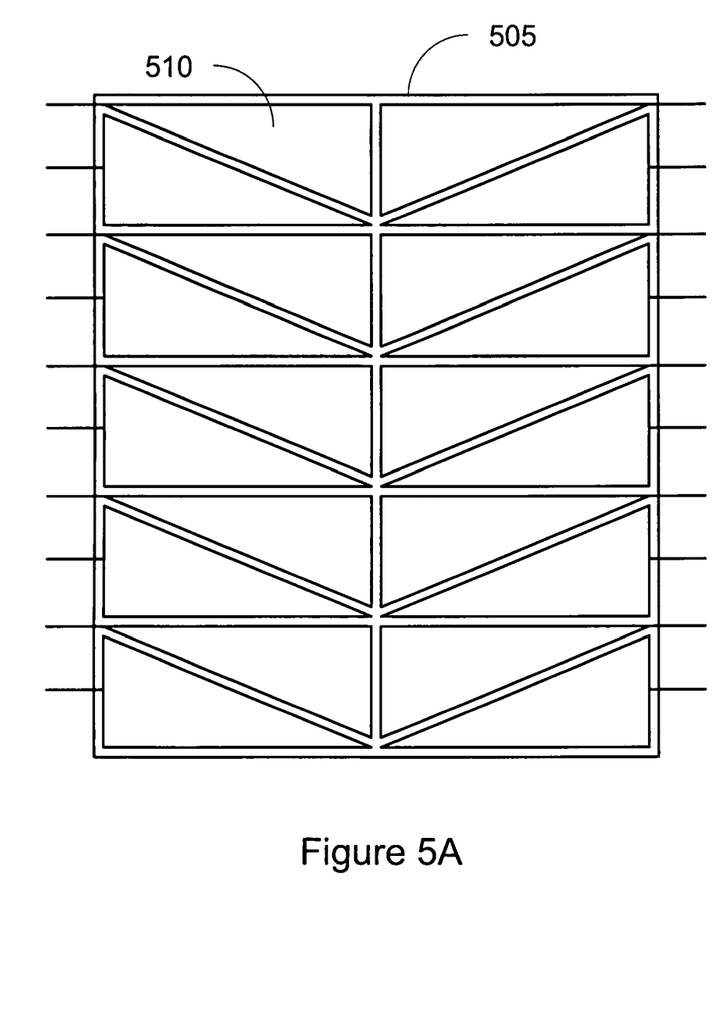
FIGS. 5A through 5C are block diagrams illustrative of a touch-sensitive device having multiple conductive regions in accordance with some embodiments.
Figure 5B:
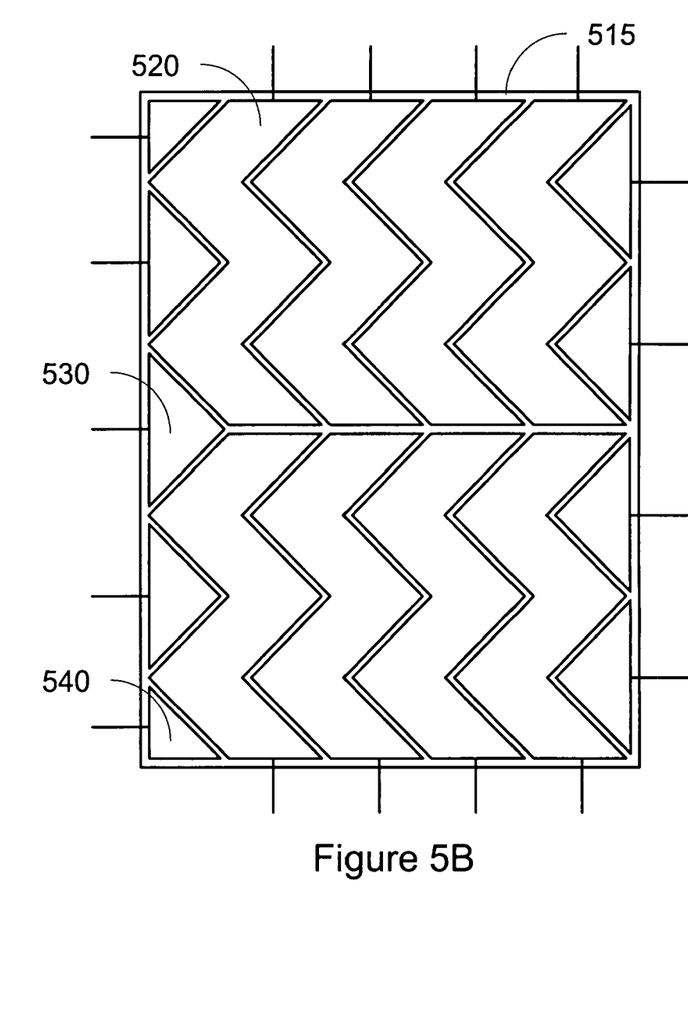
Figure 5C:
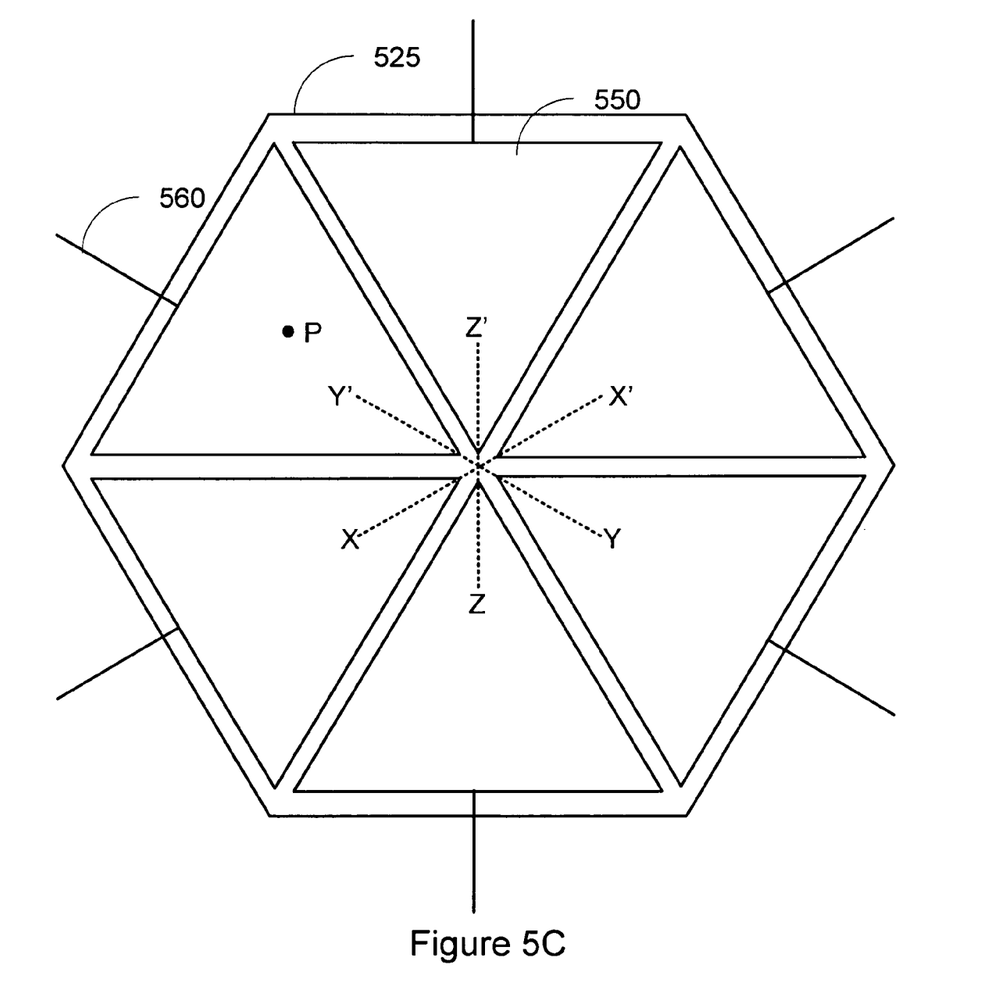

FIGS. 5A through 5C are block diagrams illustrative of a touch-sensitive device having multiple conductive regions in accordance with some embodiments. As shown in FIG. 5A, the touch panel 505 has a rectangular shape and its contact film is divided into 20 triangles of the same size. Each triangle represents a conductive region 510 with its own output terminal. Using the same scheme described above in connection with FIGS. 3 and 4 of measuring voltage output signals when a power supply is applied to opposite edges of the touch panel 505, it is possible to detect the x-coordinates and y-coordinates of multiple simultaneous finger contact points at different conductive regions of the touch panel 505. Generally, dividing the contact film into many small conductive regions can help to improve the multi-point touch panel's resolution.

FIG. 5B depicts a touch panel 515 having a contact film that includes multiple conductive regions of different shapes and different sizes. Some of the conductive regions 520 are of "M"-shape while others 530, 540 are of triangle-shape, each conductive region having its own output terminal. Using the same scheme described above in connection with FIGS. 3 and 4 of measuring voltage output signals when a power supply is applied to opposite edges of the touch panel 515, it is possible to detect the x-coordinates and y-coordinates of multiple simultaneous finger contact points at different conductive regions of the touch panel 515. A touch panel with the configuration shown in FIG. 5B is desired if the different regions and/or different directions on the touch panel are designed for different uses and therefore have different resolution requirements. For example, the touch panel 515 shown in FIG. 5B may have a higher resolution requirement on the edges and in the lateral direction of the touch panel than the resolution requirement in the central region and the vertical direction.

FIG. 5C depicts a hexagon-shape touch panel 525 having multiple conductive regions. The contact film of the touch panel 525 is divided into six conductive regions 550, each region being of an equilateral triangle and having its own output terminal. In this embodiment, assume that there is a finger contact point "P" with a particular conductive region. To determine the location of the finger contact point, a power supply is applied to the touch panel 525 along three different directions, i.e., X-X' direction, Y-Y' direction, and Z-Z' direction. For each direction, there is a separate output signal at the output terminal 560. This output signal can determine the contact point in this particular location. Repeating the same procedure in the three directions generates three estimates of the contact point's location. Because the relationship between the three directions is known, any two of the three estimates can be used to uniquely determine the contact point on the touch panel and the third estimate can be used to improve the accuracy of the contact point's location on the touch panel 525. It will be apparent to one skilled in the art to perform more measurements along other directions if a further improvement of the touch panel's resolution is desired.

Figure 6:
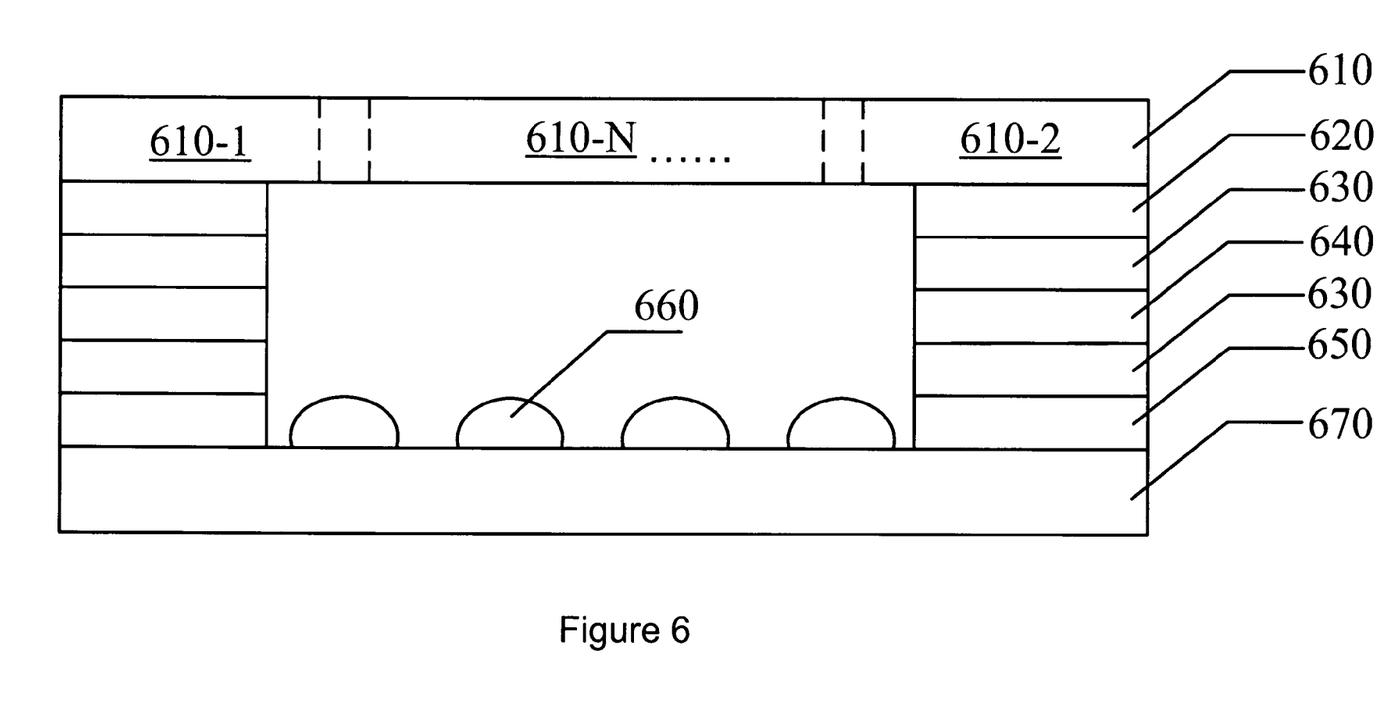
FIG. 6 is a block diagram illustrative of a cross-sectional view of a multi-point touch-sensitive panel having multiple conductive regions in accordance with some embodiments.

FIG. 6 is a block diagram illustrative of a cross-sectional view of a multi-point touch-sensitive panel having multiple conductive regions in accordance with some embodiments. Note that the dimensions of the layers shown in the figure are for illustrative purpose only and they do not necessarily represent the actual dimensions of different layers.

The conductive layer 670 represents a layer coated with conductive and transparent materials like ITO or LEP on the top surface of the base substrate of the touch panel. A spacer layer 660 is deposited on the conductive layer 670. In some embodiments, the spacer layer 660 is comprised of a two-dimensional array of microdot spacers. The array of microdot spacers separates the upper conductive layer from the lower conductive layer to avoid accidental or unintended contacts. In some embodiments, the array of microdot spacers is printed onto the lower conductive layer 670 by a proprietary process that has precise control over dot size, height and density. In some embodiments, a predefined dot density determines the corresponding operation method supported by the touch panel. For example, a low dot density may be sufficient for finger contacts with a large fingerprint. In contrast, a much higher dot density may be required to support a stylus-like input device. In some embodiments, there is a slight positive air pressure in the cavity between the layers to prevent the accidental or unintended contacts as well as dirt and dust from damaging the touch panel.

A lower electrode layer 650 is distributed along the edges of the conductive layer 670. The electrode layer 650 and the conductive layer 670 are electrically coupled together. In some embodiments, the lower electrode layer 650 is comprised of two or more electrically insulated portions and each portion is electrically coupled to a set of electrodes deployed along the same edge of the base 300 as shown in FIG. 3. When the anode and cathode of a power supply is connected to the two sets of electrodes at the two opposite edges of the conductive layer 670, there is a current flow through and a voltage drop across the conductive layer 670.

The conductive layer 610 represents another layer coated with conductive and transparent materials like ITO or LEP on the bottom surface of the contact film of the touch panel. The dashed-lines in the conductive layer 610 indicate that the layer is divided into multiple electrically isolated regions 610-1, 610-2, and 610-N. An upper electrode layer 620 is deployed along the edges of the conductive layer 610. In some embodiments, this upper electrode layer 620 is divided into multiple electrically isolated segments and each segment is electrically coupled to one of the conductive regions 610-1, 610-2, and 610-N in the upper conductive layer 610. When a conductive region of the upper conductive layer 610 is brought into contact with the lower conductive layer 670 at a particular point, a voltage signal is transmitted through a segment of the upper electrode layer 620 to a corresponding output terminal and then to a microcontroller coupled to the touch panel.

Two electrically insulators 630 are each attached to a respective side of the upper and lower electrode layers 620 and 650, which are used to prevent the two electrode layers 620 and 650 from being coupled to each other and avoid potential malfunction of an electronic application using the multi-point touch panel. In some embodiments, the two electrically insulators 630 are combined together by a double-sided adhesive layer 640. In some other embodiments, the double-sided adhesive layer 640 itself is an electrically insulator. In this case, the two upper and lower electrode layers 620 and 650 are directly attached to the double-sided adhesive layer 640 together and the two electrically insulators 630 can be saved.

Figure 7:
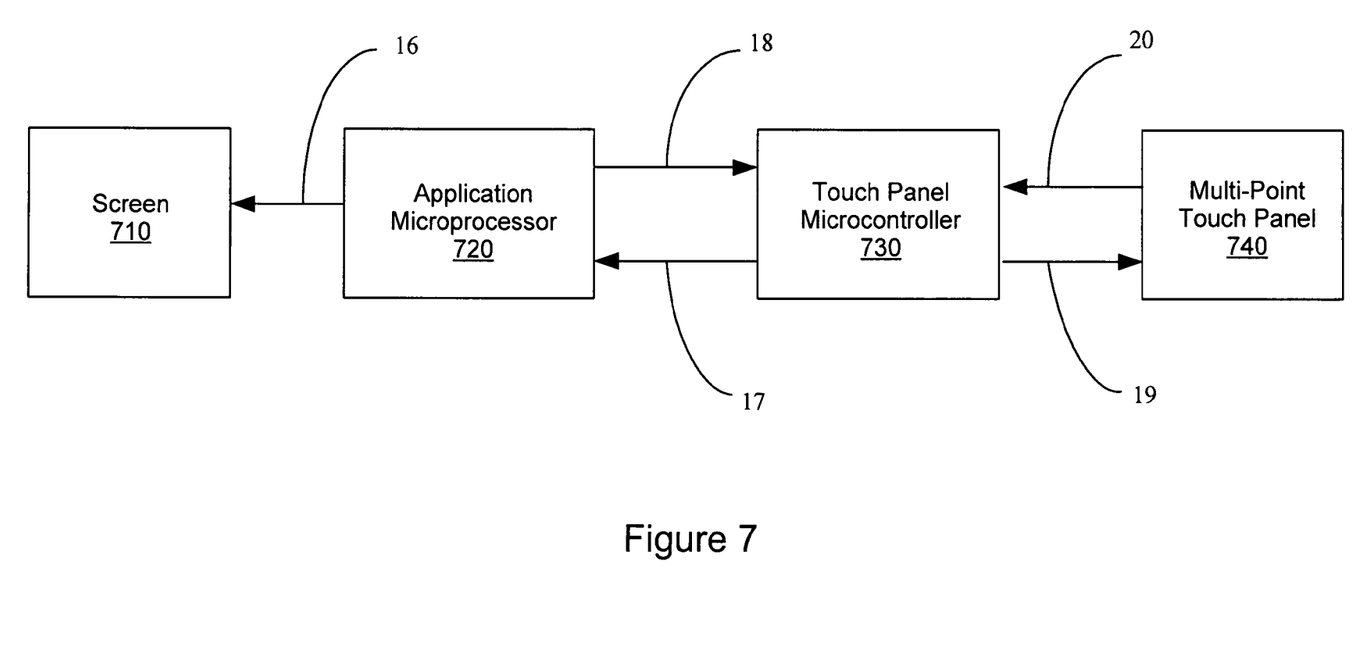
FIG. 7 is a flow chart illustrative of an overview of data flow within a multi-point touch-sensitive system in accordance with some embodiments.

FIG. 7 is a flow chart illustrative of an overview of data flow within a multi-point touch-sensitive system in accordance with some embodiments.

The multi-point touch-sensitive system includes a screen 710, an application microprocessor 720, a touch panel microcontroller 730, and a multi-point touch panel 740 as described above. In some embodiments, the multi-point touch-sensitive system is or is part of a portable electronic application such as a mobile phone, a game console, a global position system (GPS), and a personal digital assistant (PDA). In some other embodiments, the multi-point touch-sensitive system is or is part of a public system such as an ATM machine at a bank's branch office, an automatic ticket seller at a train station, and a book circulation registration system in a public library. In some other embodiments, the multi-point touch-sensitive system is or is part of an automobile electronic control system or a product manufacturing control system.

At operation, the microcontroller 730 sends instructions to the touch panel 740 through the control signal 19 to detect user-entered commands or requests using multiple finger contacts or a multi-contact pen-like tool simultaneously. Upon receipt of the user requests, the touch panel 740 generates multiple output signals 20 from the multiple conductive regions as described above and transmits the output signals 20 to the microcontroller 730. The microcontroller 730 processes the output signals 20 to determine the location-related information 17 of the multiple contacts and sends the location-related information 17 to the application microprocessor 720 (e.g., a CPU processor).

The microprocessor 720 performs predefined operations based on the location-related information 17 and displays operation results 16 on the screen 710. For example, the user may use a multi-point finger gesture to rotate a picture displayed on the screen. Based on the multiple fingers' movement on the screen, the microprocessor 720 replaces the original picture with a rotated picture by rotating the picture by, e.g., 90°. In some embodiments, the microprocessor 720 also sends reply signals 18 back to the microcontroller 730. Based on the reply signals 18, the microcontroller 730 may issue new instructions to the touch panel 740. In some embodiments, the microprocessor 720 and the microcontroller 730 correspond to different circuitry regions within one integrated circuit such as an ASIC.

Figure 8:
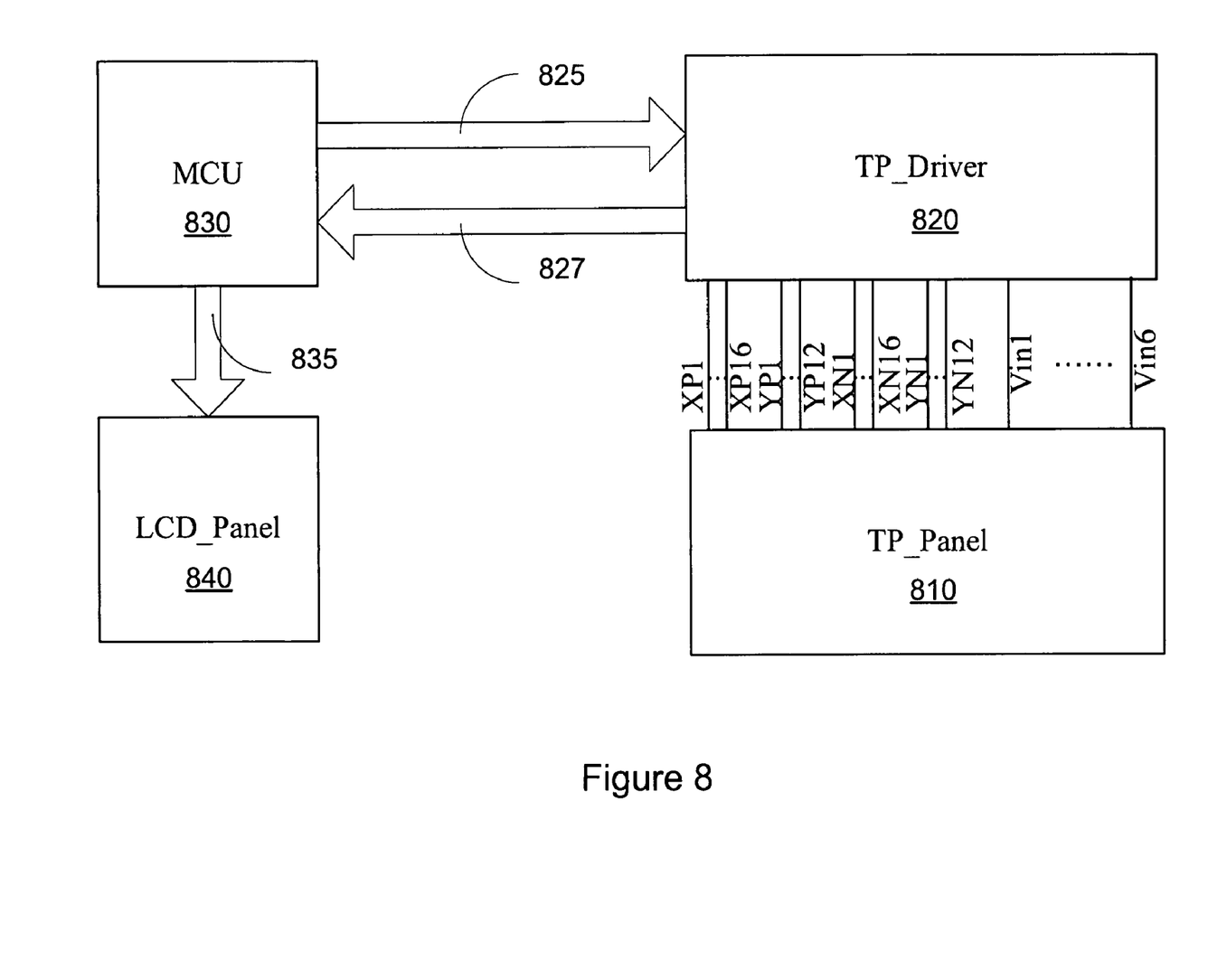
FIG. 8 is a block diagram illustrative of a first multi-point touch-sensitive system in accordance with some embodiments.

FIG. 8 is a block diagram illustrative of a first multi-point touch-sensitive system in accordance with some embodiments.

There are multiple communication channels between the touch panel 810 and the touch panel driver 820. For illustrative purpose, assume that the touch panel 810 has the same structure as the one shown in FIG. 3. The output terminals $V_{in1}$ through $V_{in6}$ are each coupled to one of the six conductive regions in the upper conductive layer and are configured to generate and export voltage signals when there are multiple simultaneous finger contacts with the top surface of the touch panel 810.

Upon detecting an output signal from any of the six conductive regions, the touch panel driver 820 notifies the microcontroller 830 using an interrupt signal 827. The microcontroller 830, in response, sends operation instructions 825 to the touch panel driver 820, the operation instructions including measuring the voltage outputs at the six conductive regions and translating the outputs, if any, into the coordinates of a touch event at a corresponding conductive region. In some embodiments, the touch panel driver 820 includes multiple voltage signal measurement units, each unit responsible for monitoring one or more conductive regions. These multiple voltage signal measurement units may work in parallel. In some other embodiments, the touch panel driver 820 includes a single signal measurement unit. In this case, the unit is responsible for monitoring all the conductive regions on the touch panel in a sequential manner, one region at a time. In some embodiments, the touch panel driver 820 and the microcontroller 830 have a sufficiently high signal processing capacity. Thus, the multi-point touch-sensitive system is able to detect whether there is a touch event in any of the multiple conductive regions, and if there is a touch event at a particular conductive region, estimate the corresponding location of the touch event. Although the touch events at different conductive regions are determined sequentially, they are virtually simultaneous from the user's perspective. Whether the touch panel driver 820 includes one or multiple signal measurement units depends on the specific application that employs the multi-point touch panel.

After determining the locations of the multiple, simultaneous or virtually simultaneous touch events, the microcontroller 830 performs operations on the objects displayed on the screen 840 that are identified by the locations. For example, if the user applies a multi-point finger gesture to rotate a picture displayed on the screen 840, the microcontroller 830 replaces the original picture with a rotated picture by rotating the picture by, e.g., 90°.

Figure 9:
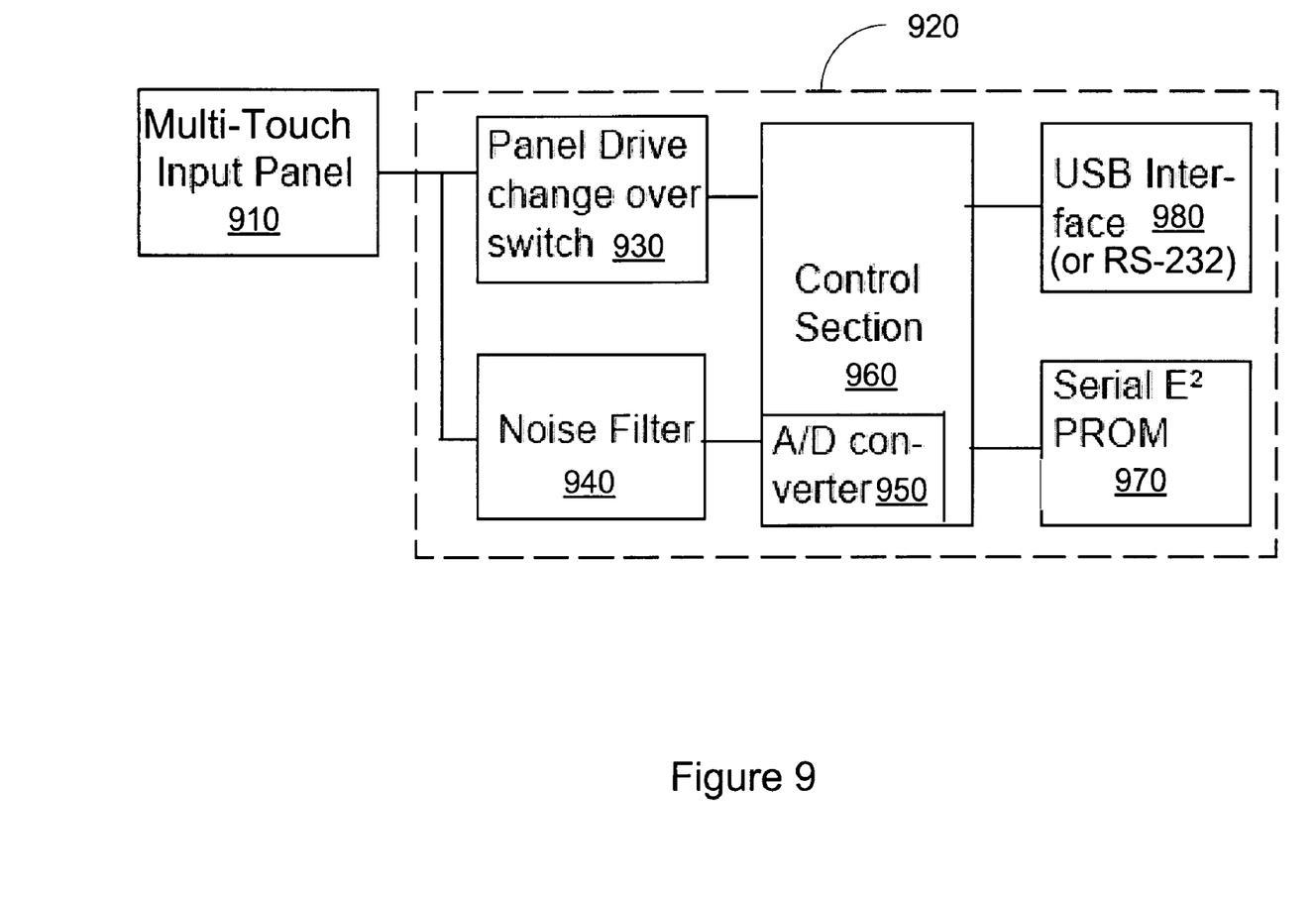
FIG. 9 is a block diagram illustrative of a second multi-point touch-sensitive system in accordance with some embodiments.

FIG. 9 is a block diagram illustrative of a second multi-point touch-sensitive system in accordance with some embodiments.

The multi-touch input panel 910 is coupled to a microcontroller 920. In some embodiments, the microcontroller 920 is an ASIC chip including multiple circuits. In some other embodiments, the microcontroller 920 is an electronic system that is comprised of multiple ICs, each IC having a specific function. For example, the panel drive 930 is responsible for controlling the switches, e.g., turning on/off the switches, in the different control circuits shown in FIG. 4A. By scheduling the on/off sequence of the switches in different directions, the multi-point touch-sensitive system can measure the x-coordinates and y-coordinates of the respective touch events, simultaneous or not, at different conductive regions.

The multi-touch panel 910 submits its output signals from different conductive regions to a noise filter 940. Many noise suppression algorithms known in the art can be implemented in the noise filter 940 to improve the output signals' resolution and reduce the error of estimating the locations of the touch events. After suppressing noise in the output signals, the noise filter 940 passes the output signals to the A/D converter 950 in the control section circuit 960. The A/D converter 950 digitizes the analog output signals generated by the touch panel 910. The resolution of the A/D converter 950, to some extent, affects the resolution of the multi-touch panel 910. A typical A/D converter in a multi-point touch-sensitive system has at least 8 bits, and maybe 12 bits or more.

The control section circuit 960 includes or is coupled to an erasable memory device 970. In some embodiments, the memory device 970 stores one or more signal processing algorithms for estimating the touch event location information based on the digitized output signals. The size of the memory device 970 depends on the complexity of the signal processing algorithms. A typical memory chip has at least 4K bits or more. The control section circuit 960 retrieves one or more signal processing algorithms from the memory device 970 and applies the algorithms to the digitized output signals generated by the A/D converter 950 to determine the locations of the corresponding touch events on the multi-touch panel 910.

In some embodiments, the microcontroller 920 includes one or more interface circuits 980. Through the interface circuits 980, the microcontroller 920 is coupled to other devices within the same electronic application (e.g., the microprocessor 720 in FIG. 7) or some other electronic applications external to the multi-point touch-sensitive system. Information about the touch events can be transmitted to the other devices or applications through the interface circuits 980. The other devices or applications can also send instructions to the multi-point touch-sensitive system through the interface circuits 980. In some embodiments, the interface circuits 980 are proprietary devices designed for a specific application. In some other embodiments, the interface circuits 980 are interface circuits that are compatible with standard I/O protocols, such as USB and RS-232.

Figure 10:
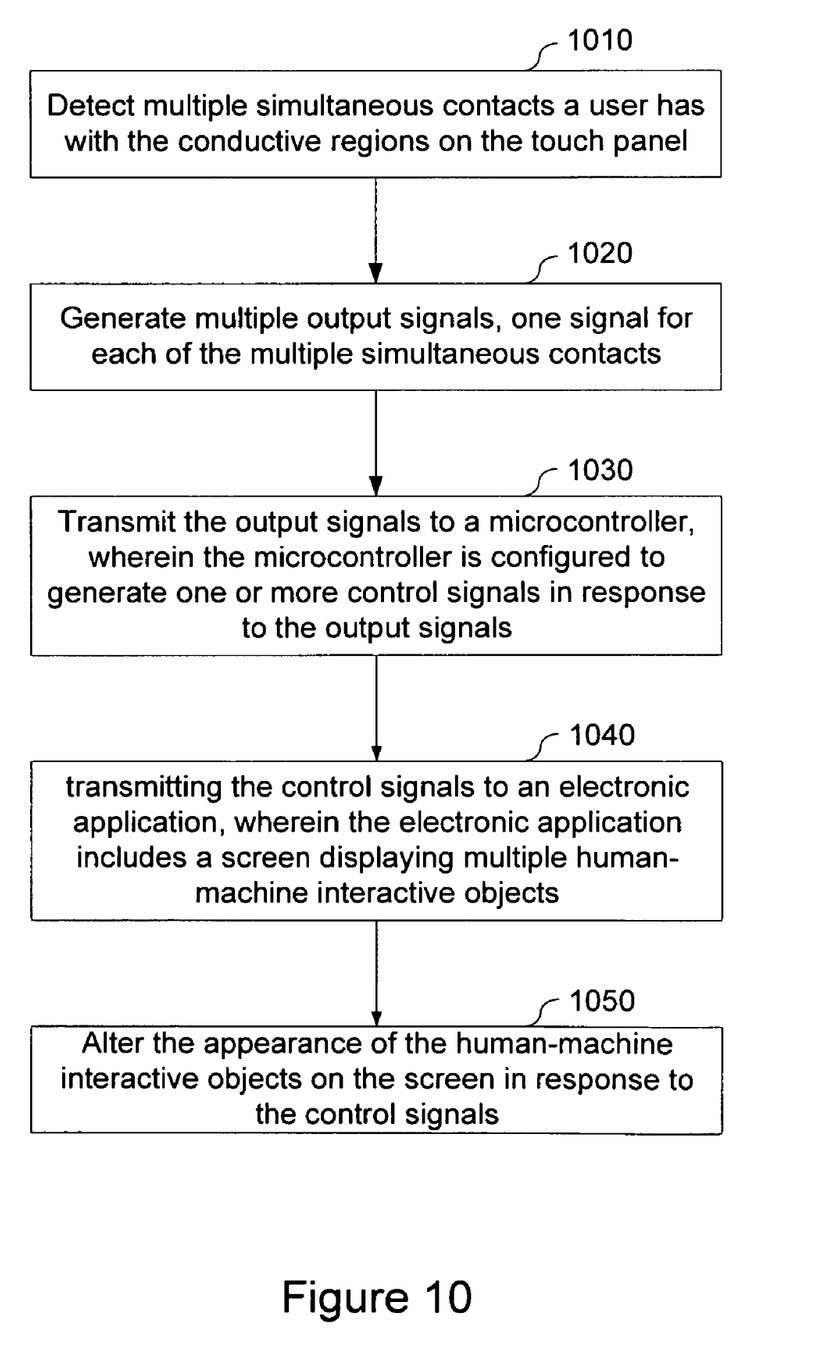
FIG. 10 is a flow chart illustrative of how a multi-point touch-sensitive system operates in accordance with some embodiments.

FIG. 10 is a flow chart illustrative of how a multi-point touch-sensitive system operates in accordance with some embodiments. As described above in connection with FIGS. 7 through 9, a multi-touch detection system typically includes a touch-sensitive device, a microcontroller coupled to the touch sensitive device, and an electronic application coupled to the microcontroller. The touch-sensitive device has multiple electrically isolated conductive regions that are configured to detect simultaneous finger contacts with the touch-sensitive device.

In response to detecting multiple simultaneous contacts a user has with the conductive regions (1010), the touch-sensitive device generates multiple output signals (1020). In some embodiments, there is one signal for each of the multiple simultaneous contacts. In some embodiments, the multiple output signals are generated simultaneously. In some other embodiments, the multiple output signals are generated sequentially. In some other embodiments, the multiple output signals are divided into multiple sets. While the output signals within a particular set are generated sequentially, the output signals from different sets are generated simultaneously.

The multiple output signals are transmitted to the microcontroller (1030). In some embodiments, the microcontroller includes multiple signal processing units, each unit responsible for processing one or more output signals. The multiple signal processing units process the multiple output signals in parallel. In some other embodiments, the microcontroller has one signal processing unit that processes the multiple output signals sequentially, one signal at a time. In some other embodiments, the microcontroller prioritizes the output signals in accordance with their associated conductive regions. For example, an output signal associate with a conductive region at a particular region of the touch panel (e.g., the central region) is given a higher priority. Accordingly, the microcontroller processes this output signal first before processing another output signal associated with another conductive region (e.g., near the edge of the touch panel). In some embodiments, this feature of ranking or prioritizing the conductive regions takes into account of the different sizes of the conductive regions. For example, an output signal from a large conductive region is processed before an output signal from a small conductive region. In some embodiments, this feature of ranking or prioritizing the conductive regions is required by an electronic application that uses the multi-point touch-sensitive system. For example, a computer game console or an ATM machine may perform one operation associated with one object on the touch screen in response to a user selection of the object through one finger contact only if there is a simultaneous or previous user selection of another object on the touch screen through another finger contact. In other words, an inherent sequence of user interacting with different objects on the touch screen may require a processing order of the user's simultaneous finger contacts with the objects. In some embodiments, the multiple conductive regions on the multi-touch panel are prioritized differently over time for different applications supported by the touch-sensitive system. In some other embodiments, this priority change is user-configurable.

The microcontroller is configured to generate one or more control signals in response to the output signals and transmit the control signals to the electronic application (1040). The electronic application includes a screen displaying multiple human-machine interactive objects. Exemplary human-machine interactive objects include text, virtual push button, images, and virtual keypad. In response to the control signals, the electronic application alters the appearance of the human-machine interactive objects on the screen (1050). For example, the electronic application may rotate an image or highlight a user-selected region on the screen.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   at a touch-sensitive device having multiple electrically isolated conductive regions,
      detecting multiple simultaneous contacts a user has with the conductive regions;
      generating multiple output signals, one signal for each of the multiple simultaneous contacts;
      transmitting the output signals to a microcontroller, wherein the microcontroller is configured to generate one or more control signals in response to the output signals;
      transmitting the control signals to an electronic application, wherein the electronic application includes a screen displaying multiple human-machine interactive objects; and
      altering the appearance of the human-machine interactive objects on the screen in response to the control signals.

2. The computer-implemented method of claim 1, wherein generating multiple output signals further comprises generating the multiple output signals simultaneously.

3. The computer-implemented method of claim 1, wherein generating multiple output signals further comprises generating the multiple output signals sequentially.

4. The computer-implemented method of claim 1, wherein generating multiple output signals further comprises:
   dividing the multiple conductive regions into multiple sets of conductive regions;
   generating the output signals from the same set of conductive regions sequentially; and
   generating the output signals from the different sets of conductive regions simultaneously.

5. The computer-implemented method of claim 1, wherein generating multiple output signals further comprises:
   assigning a respective priority to each of the multiple conductive regions; and
   generating the output signals in accordance with the priorities of the conductive regions that are associated with the output signals.

6. The computer-implemented method of claim 5, further comprising:
   assigning a conductive region near the center of the touch-sensitive device a higher priority; and
   assigning a conductive region near the edge of the touch-sensitive device a lower priority.

7. The computer-implemented method of claim 1, further comprising:
   for each of the multiple simultaneous contacts,
      identifying one of the multiple conductive regions and associated output signals for the contact;
      determining location information of the contact using the identified output signals; and
      identifying one of the human-machine interactive objects using the location information.

8. The computer-implemented method of claim 1, further comprising:
   transmitting the output signals to a noise filter, wherein the noise filter is configured to reduce noise from the output signals generated by the touch-sensitive device.

9. The computer-implemented method of claim 1, further comprising:
   transmitting the output signals to an A/D converter, wherein the A/D converter is configured to digitize the output signals generated by the touch-sensitive device.

10. The computer-implemented method of claim 1, wherein the multiple electrically isolated conductive regions are of one size.

11. The computer-implemented method of claim 1, wherein the multiple electrically isolated conductive regions are of at least two sizes.

12. The computer-implemented method of claim 1, wherein at least one of the multiple electrically isolated conductive regions has a shape of a polygon.

13. The computer-implemented method of claim 12, wherein the polygon has a regular shape.

14. The computer-implemented method of claim 12, wherein the polygon has an irregular shape.

15. The computer-implemented method of claim 12, wherein the polygon has a shape selected from the group consisting of circle, ellipse, triangle, rectangle, square, and hexagon.

16. The computer-implemented method of claim 1, wherein the human-machine interactive objects include text, virtual push button, images, and virtual keypad.

17. The computer-implemented method of claim 1, wherein the altering the appearance of the human-machine interactive objects further includes rotating an image on the screen in response to the multiple simultaneous contacts.

18. The computer-implemented method of claim 1, wherein at least one of the multiple conductive regions is made of a conductive and transparent material.

19. The computer-implemented method of claim 18, wherein the conductive and transparent material is indium tin oxide.

20. The computer-implemented method of claim 18, wherein the conductive and transparent material is light-emitting polymer.

* * * * *